(12) United States Patent
Velusamy et al.

(10) Patent No.: US 8,886,153 B2
(45) Date of Patent: Nov. 11, 2014

(54) METHOD AND APPARATUS FOR CONFIGURING A MOBILE DEVICE TO PROVIDE EMERGENCY NOTIFICATION

(75) Inventors: Umashankar Velusamy, Tampa, FL (US); Devin C. Moore, Lewis Center, OH (US); Wade P. Thompson, Moore, SC (US); Bhaskar R. Gudlavenkatasiva, Tampa, FL (US); George L. Hughes, Wesley Chapel, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 707 days.

(21) Appl. No.: 12/975,503

(22) Filed: Dec. 22, 2010

(65) Prior Publication Data
US 2012/0164968 A1    Jun. 28, 2012

(51) Int. Cl.
*H04M 11/04* (2006.01)
*H04W 4/22* (2009.01)
*H04W 4/04* (2009.01)

(52) U.S. Cl.
CPC ............... *H04W 4/22* (2013.01); *H04W 4/046* (2013.01)

USPC .................. 455/404.1; 455/404.2; 455/412.1; 455/414.1; 455/456.3; 455/345; 709/219

(58) Field of Classification Search
USPC ............................................ 455/404.1, 404.2
See application file for complete search history.

(56) References Cited

U.S. PATENT DOCUMENTS

| 8,233,919 B2* | 7/2012 | Haag et al. .................. 455/456.3 |
| 2009/0051510 A1* | 2/2009 | Follmer et al. ............. 340/425.5 |

* cited by examiner

*Primary Examiner* — Charles Appiah
*Assistant Examiner* — Randy Peaches

(57) ABSTRACT

An approach for configuring a mobile device to enable accident detection and notification functionality for use within a vehicle is described. An emergency notification platform receives position information and acceleration information associated with a mobile device. The emergency notification platform applies a rule to the position information and the acceleration information to determine an alert condition. A notification message is then generated for presentation on the mobile device based on the application of the rule, wherein the notification message specifies information relating to the alert condition.

18 Claims, 13 Drawing Sheets

400

METHOD AND APPARATUS FOR CONFIGURING A MOBILE DEVICE TO PROVIDE EMERGENCY NOTIFICATION

BACKGROUND INFORMATION

Mobile devices are often used by users, particularly while driving, to place emergency calls for medical help, police or personal contacts due to the occurrence of a vehicle accident. If the nature of the accident, however, is such that the driver is incapacitated or unable to dial for help for any reason, no emergency help can be readily dispatched. Consequently, modern day accident detection systems utilize various sensors to detect airbag deployment, structural deformity of the vehicle and other physical triggers to determine the occurrence of accidents for enabling automatic notification of emergency responders. To take full advantage of these systems, the vehicle must be configured with specialized hardware and user control equipment. Unfortunately, there is no convenient means of configuring a vehicle with an accident detection system without requiring installation or specific configuration of the vehicle. Moreover, if the user is a passenger in a vehicle not owned by the user, such as bus, taxi, or even a friend's car, the user may be vulnerable in an emergency situation if the vehicle was not properly configured.

Therefore, there is a need for an approach to provide emergency notification with greater convenience for users in various different contexts.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for configuring a mobile device to enable accident detection and notification functionality for use within a vehicle is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a mobile device, it is contemplated that these embodiments have applicability to any device capable of communicating over a network using voice and non-voice technologies.

Figure 1:
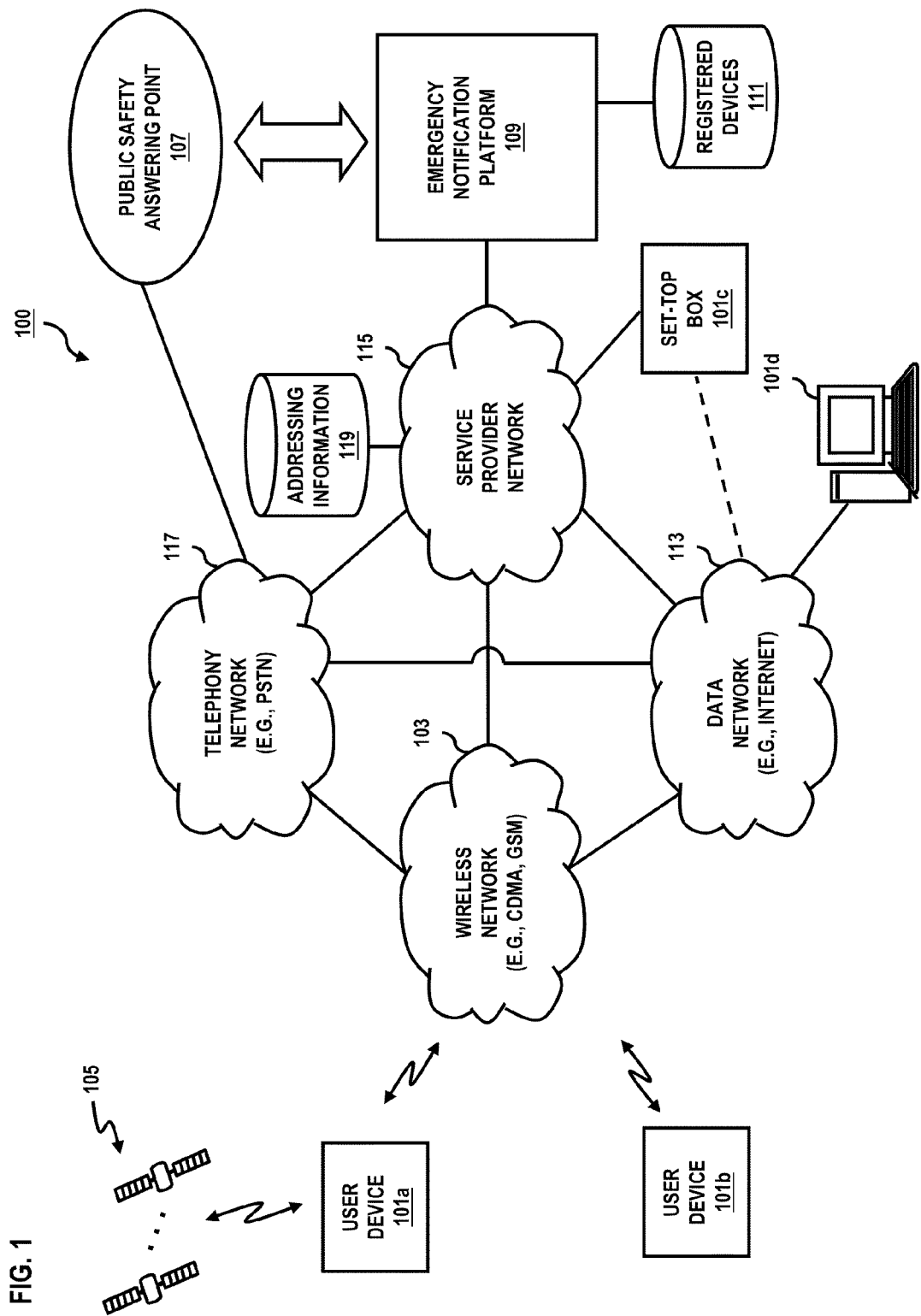
FIG. 1 is a diagram of a system capable of configuring a mobile device to enable accident detection and notification functionality for use within a vehicle, according to an exemplary embodiment.

FIG. 1 is a diagram of a system capable of configuring a mobile device to enable accident detection and notification functionality for use within a vehicle, according to an exemplary embodiment. In certain embodiments, "emergency notifications" pertains to any alerts, calls or notices transmitted by a requesting user device 101a-101b to one or more emergency contacts. By way of example, the user device may be a mobile device, such as a cell phone, Smartphone, wireless computer (e.g., laptop, tablet PC), personal data assistant (PDA) or the like. Notifications, which may be in form of messages and implemented by such user devices, may include "911" telephone calls as placed to a public safety answering point (PSAP) 107, i.e., as facilitated by law enforcement agencies, emergency medical agencies, the fire department, etc. In other instances, a notification message may be directed to one or more personal contacts of the user for indicating user duress, an accident condition or other emergency needs. This may include calling, e-mailing or short simple messaging (SMS) user devices belonging to a spouse, parent, family member, friend or other personal acquaintance of the user. For the purpose of illustration, any user device 101 capable of receiving messages from another user device 101 over a communication network may serve as a predetermined destination.

It is noted that emergency notifications are distinct from non-emergency notifications that may be generated by the user device 101a-101b. For example, non-emergency messages placed by a user of a user device may not require urgent attention on the part of the recipient(s) of the message, whereas emergency notification messages generally require immediate attention and response on the part of the recipient(s). Given the high urgency associated with such messages, the notification message, whether by way of voice or data communication, must be accompanied by identification and location information of the requesting party in order to enable effective and immediate response. This includes address information, street or intersection information, emergency needs, conditions or situational details, user names and identifiers, inhibiting factors affecting or associated with the requesting user (e.g., inclement weather, roadblocks, etc.), other parties affected by the accident and other relevant data.

Performing emergency notification for the purpose of enabling a response to user emergency needs is especially important in accident situations involving vehicles, which may include automobiles, motorcycles, bicycles, or other transportation means. Vehicle accidents may occur due to numerous factors, including weather conditions, adverse traffic conditions, erratic driving, pedestrian or animal obstructions, etc. In certain instances, the people involved in the vehicle accident may require medical attention by emergency responders. For this reason, mobile devices are useful in seeking medical aid; however, these devices are not available if the user is incapacitated or otherwise unable to use such devices. Furthermore, the ability of emergency responders to dispatch help immediately to is limited when the user is unable to provide location information and other pertinent details.

To address this need, some vehicles are equipped with accident detection systems that utilize various sensors to detect airbag deployment, structural deformity of the vehicle and other physical triggers for indicating accidents. Generally, in response to the occurrence of an accident, the accident detection system enables automatic notification of emergency responders. The system may also provide location data of the vehicle, such as that obtained by way of global positioning system (GPS) technology. As noted, the vehicle must be configured with specialized hardware and user control equipment. Unfortunately, there is no convenient means of configuring a vehicle with accident detection features without requiring installation of equipment or customized configuring of the vehicle. Moreover, while mobile devices are useful for enabling contact to be made with emergency respondents, they are not readily adaptable to perceiving accident and/or emergency conditions automatically. Consequently, in instances where the mobile device user is incapacitated or unable to initiate a call for any reason, mobile devices are ill equipped to enable automated emergency notifications to be directed to the public safety answering point (PSAP), emergency contacts designated by the user, etc.

To address this problem, the approach of system 100, according to certain embodiments, enables any user device 101a-101b, such as a mobile phone, Personal Digital Assistant (PDA), Smartphone or the like to be configured to detect accident and/or emergency conditions that may impact a vehicle along a given travel path. Moreover, the system 100 provides a mechanism for enabling notification messages to be automatically directed to one or more predetermined (calling) destinations, including the user device of a neighbor, a family member, a friend, or an emergency responder such as the police or fire department. By way of this approach, a user device 101 may be properly configured to provide a user with features typically associated only with integrated accident detection systems without requiring installation of equipment or an additional subscription with a featured accident detection services provider. Rather, the user of the device 101 may subscribe with an emergency notification platform 109, i.e., as provided by their wireless communication service provider, for enabling the device to handle vehicle based emergencies.

By way of example, user devices 101a-101b (e.g., mobile phones) may be configured to gather acceleration and position information as the phone traverses along a travel path of the vehicle. Under this scenario, the compiled data records indicating the user's speed and the current navigational course or driving patterns (e.g., whether the driver is staying within the lanes on a highway) can be tracked on a continual or periodic basis, such as by the emergency notification platform 109. This may include the acquiring of geospatial data, global positioning system coordinate data and other like information for computing device location and detecting its relative speed of movement. When an accident condition or course deviation is detected, based on the acquired data, notification messages may be presented to the user interface of the device 101 that the user can respond to relative to the condition. Also, depending on the user response, a further notification message (e.g., call, SMS, e-mail) may be initiated and transmitted to predetermined end-points as specified by the user including family, friends, 911 and Emergency 911 (E911), etc. By way of example, a user device 101a may transmit a notification message to another user device 101b as specified by the initiating user.

Hence, the emergency notification platform 109 may operate in connection with the user devices 101 by way of a communication network. The emergency notification platform 109, among other capabilities, can retrieve the acceleration and position information collected by user devices 101a-101b on behalf of the respective subscribing user. As will be discussed further, the emergency notification platform 109 then employs configurable rules and algorithms—i.e., as established by the user, device manufacturer or both—against the data to enable it to detect emergency situations such as an accident or deviation from the path as determined by the navigation function of the device. In other words, the platform 109, in one embodiment, can initiate the accident or emergency notification. For example, if the accident results in the mobile device 101a being damaged as to disable its communication capabilities, the "network" (via the platform 109) can provide the notification. Under such a scenario, the platform 109 can detect a sudden loss of signal from the mobile device 101a (noting that the device 101a was moving at a high rate of speed, and no other factors were dominate, e.g., dead zone, or low battery level).

Still further, the platform 109 may also prompt or initiate the generation of notification messages to the subscribers (e.g., users of devices 101a-101b) for indicating the nature and severity of the event or alert condition. This may include notification messages for conveying imminent traffic pileups, hazardous driver alerts, inclement weather, road obstructions, etc. It is noted that the emergency notification platform 109 and user devices 101 share and generate emergency notifications and alerts based upon known travel path and navigational course data.

In certain embodiments, the Public Safety Answering Point (PSAP) 107 operates in conjunction with the emergency notification platform 109 to provide a notification capability. By way of example, the platform 109 can generate and transmit a notification message to one or more predetermined contacts at the same time of placement of an emergency notification to the PSAP. A database 111 is maintained to store information about which users and devices are subscribed to participate in the emergency notification service. This registration data may also indicate the user's various predetermined contacts to be notified in the event of an emergency.

As shown in the example of FIG. 1, a constellation of global positioning system (GPS) satellites 105 can communicate with the mobile devices 101a, 101b to provide such information as well as identify location. By way of example, one or more mobile devices 101a, 101b may be configured to determine corresponding spatial positioning information through conventional satellite positioning system (SPS) technology, such as GPS technology; however, any suitable navigational or location determination technology may be utilized, such as advanced forward link trilateration (A-FLT), assisted-GPS (A-GPS), enhanced cellular identification (CELL-ID), wireless area network (WLAN) positioning, etc. SPS technology utilizes a constellation of satellites that transmit signals to receivers (not shown) of, for example, one or more mobile devices 101a, 101b, so that the receivers may determine corresponding spatial positions (or locations), speeds, directions, and/or timing for mobile devices 101a, 101b.

In certain embodiments, user devices 101a-101d may include cellular phones, BLUETOOTH-enabled devices, WiFi-enable devices, radiophone, satellite phone, smart phone, wireless phone, or any other suitable mobile device, such as a personal digital assistant (PDA), pocket personal computer, tablet, customized hardware, etc. In addition, user devices 101 may include a computer 101*d* (e.g., desktop computer, laptop, web appliance, etc.), and voice station (e.g., conventional telephone). By way of example, computing device 101*d* may be any suitable computing device capable of receiving the notification message from the platform 109; moreover, the computing device 101*d* can be a voice over internet protocol (VoIP) phone, skinny client control protocol (SCCP) phone, session initiation protocol (SIP) phone, IP phone, personal computer, softphone, workstation, terminal, server, etc.

While any of the above described devices are suitable user devices, it is also noted that the predetermined destinations/ registered devices capable of receiving notification messages can be a television or set-top-box (STB) 101*c*. By way of example, when a notification message is sent, the message can be displayed to the television of the designated emergency contact for indicating help is needed. Predetermined STBs and contacts that receive the notification messages may also notify the PSAPs on behalf of the sending user device, such as in the event the device user loses its connection with the communication network. For the purpose of illustration, user devices 101*a*-101*b* may be any device suitably equipped for generating or receiving notification messages. Furthermore, the user devices 101*a*-101*d* may be any device capable of communicating over a wireless network 103 using voice sessions as well as other non-voice sessions, e.g., short messaging service (SMS), enhanced messaging service (EMS), multimedia messaging service (MMS), instant messaging (IM), etc.

In system 100, according to certain embodiments, one or more networks, such as data network 113, service provider network 115, telephony network 117, and/or wireless network 103, are provided to handle various communication sessions, voice communications as well as non-voice communications. Networks 103 and 113-117 may be any suitable wireline and/or wireless network. For example, telephony network 117 may include a circuit-switched network, such as the public switched telephone network (PSTN), an integrated services digital network (ISDN), a private branch exchange (PBX), or other like network. As shown, an addressing information database 119, according to certain embodiments, stores street addresses of users of the various communication services. Thus, if a notification message is generated by a user device 101*a*-101*b*, for instance, the service provider 115 to which the user is subscribed can obtain the exact address information for forwarding to the PSAP 107 by way of the emergency notification platform 109. This advantageously avoids the operator having to spend time verifying the address with the caller, which may not even be possible when the user is incapacitated or unable to speak.

In one embodiment, the emergency notification platform 109 retrieves the street address from the addressing information database 119 via the service provider network 115; under this scenario, it is assumed the service provider operates the telephony network 117. However, the service provider can operate any of the other networks 103 and 113 (as well as others not shown) in which case the addressing information database 119 would store addressing information about subscribers of those networks. For example, the service provider network 115 may include a content delivery network configured to deliver select content to set-top box 101*c*.

Wireless network 103 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Additionally, the networks 113 and 115 may encompass terrestrial broadcasting networks, provider specific networks (e.g., TiVo® network, etc), and the like. Further, the service provider can be an internet protocol television (IPTV) service provider, which offers subscribers various video services ranging from multi-channel video programming that mimics traditional broadcast television, to true video-on-demand (VOD) programming. In one embodiment, service provider network 115 integrates the television medium with that of the telecommunications, computing, and media environments, thereby broadening the scope of devices and sources available to individuals for obtaining media content. In this manner, users, via user equipment (e.g., STB 101*c*) can receive media content accessible over the data network 113. Although the user equipment is described with respect to an STB, it is contemplated that various embodiments have applicability to any device capable of processing audio and/or video streams. Media content broadly includes any audiovisual content (e.g., broadcast television programs, VOD programs, pay-per-view programs, IPTV feeds, digital video disc (DVD) related content, etc.), pre-recorded media content, data communication services content (e.g., commercials, advertisements, videos, movies, songs, images, sounds, etc.), Internet services content (streamed audio, video, or pictographic media), and/or any other equivalent media form.

Although depicted as separate entities, networks 103 and 113-117 may be completely or partially contained within one another, or may embody one or more of the aforementioned infrastructures. For instance, service provider network 115 may embody circuit-switched and/or packet-switched networks that include facilities to provide for transport of circuit-switched and/or packet-based communications. It is further contemplated that networks 103 and 113-117 may include components and facilities to provide for signaling and/or bearer communications between the various components or facilities of system 100. In this manner, networks 103 and 113-117 may embody or include portions of a signaling system 7 (SS7) network, or other suitable infrastructure to support control and signaling functions. As such, the conjunction of networks 103 and 113-117 may be adapted to facilitate the remote control and tracking services of system 100.

Figure 2A:
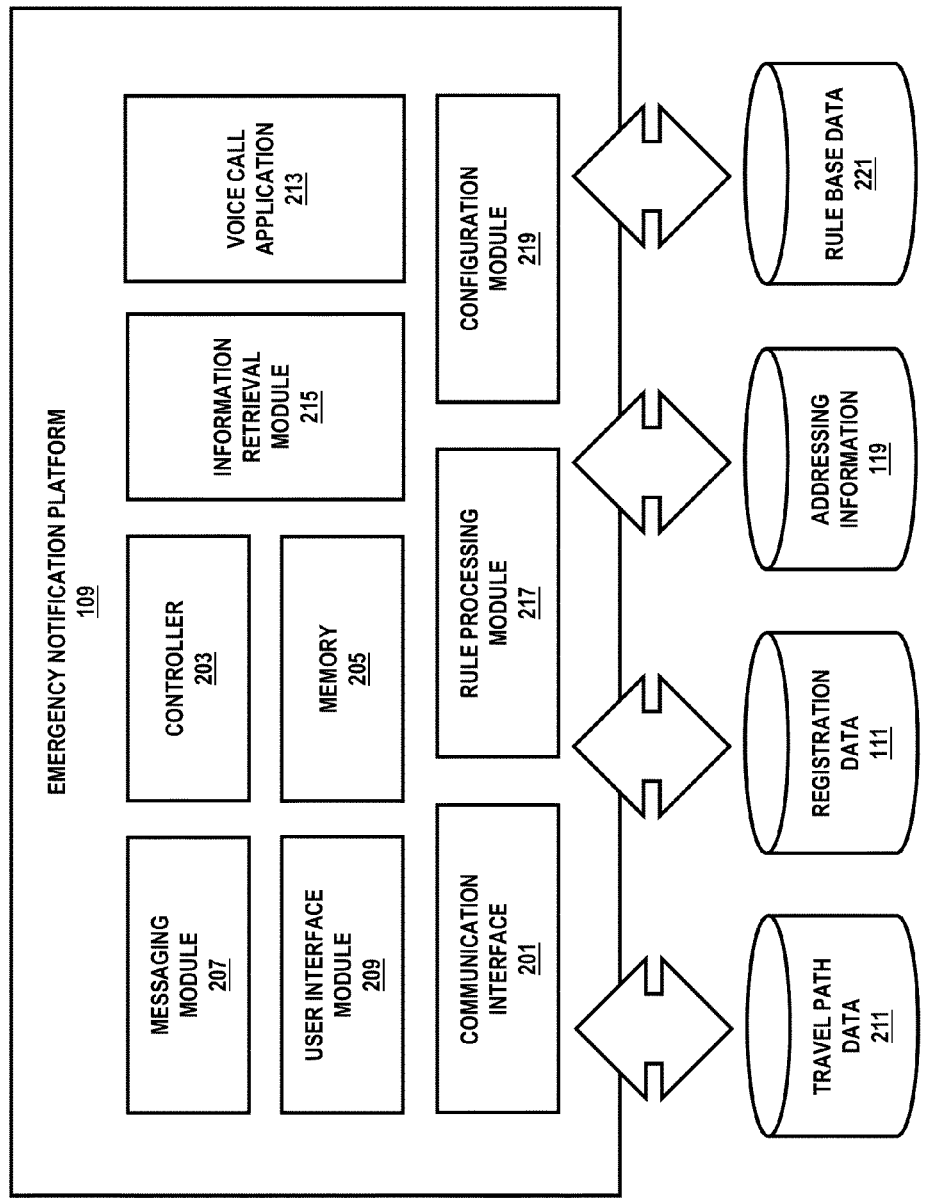
FIGS. 2A and 2B are, respectively, a diagram of an emergency notification platform and a diagram of a user device capable of enabling accident detection and notification functionality for use within a vehicle, according to various embodiments.
Figure 2B:
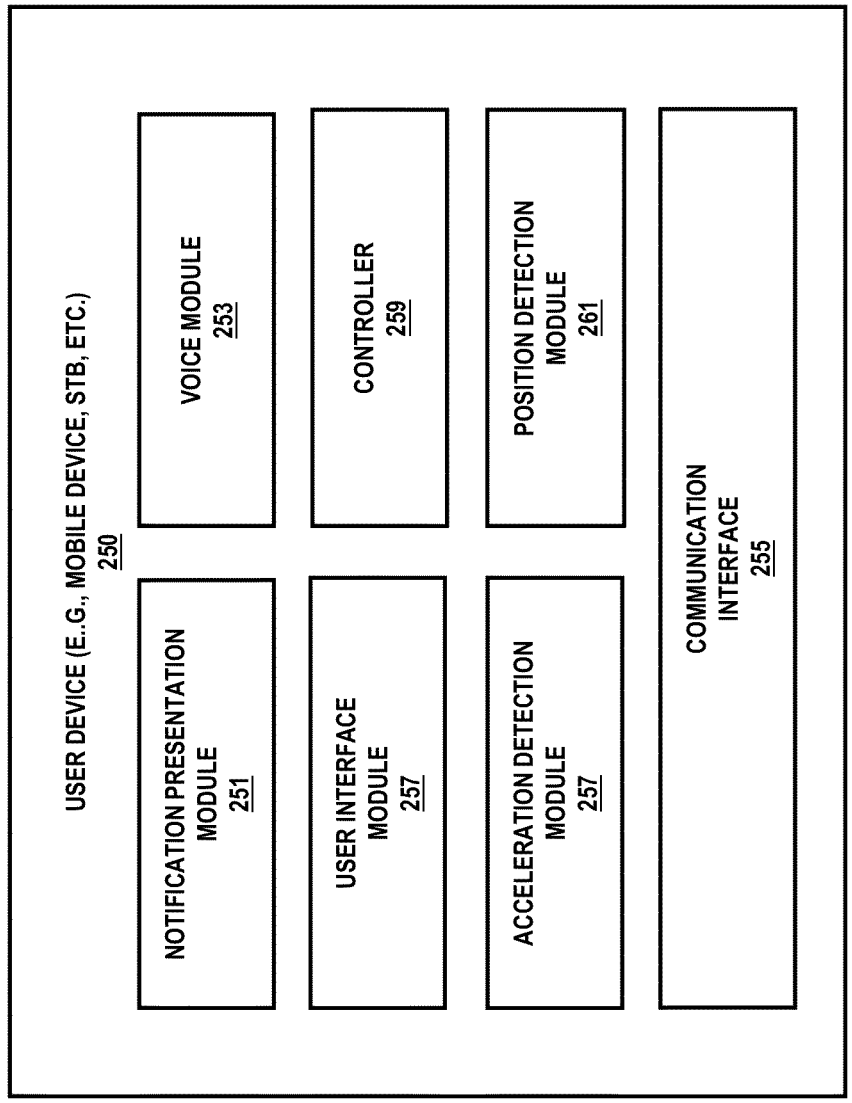

FIGS. 2A and 2B are, respectively, a diagram of an emergency notification platform and a diagram of a user device capable of enabling accident detection and notification functionality for use within a vehicle, according to various embodiments. The emergency notification platform 109 includes various executable modules for performing one or more computing, data processing and network based instructions that in combination enable user devices 101 to provide notifications responsive to detected accident or emergency conditions. Also, it is noted that the modules encompassing the emergency notification platform 109 can be implemented in hardware, firmware, software, or a combination thereof. By way of example, the emergency notification platform 109 may include a communication interface 201, controller 203, memory 205, messaging module 207, user interface module 209, voice call application 213, information retrieval module 215, rule processing module 217 and configuration module 219.

In addition, the emergency notification platform 109 also maintains one or more databases for storing data of various types. By way of example, travel path data 211 may be maintained for housing data indicative of the current and/or expected path of travel designated for a user of a mobile device, including coordinates relating to specific routes, intended destination points, current position and acceleration data, etc. The travel path data may also include data provided by third party data sources for indicating current or expected conditions that may impact travel, including weather data, traffic report data, and the like. Also, as shown, an addressing information database 119 may be maintained by platform 109 for expressly storing street addresses of users of the various communication services, such as for enabling quick reference to such data by an emergency responder via a PSAP 107.

In certain embodiments, the emergency notification platform 109 also maintains registration data 111 for indicating which users and devices are subscribed to participate in the emergency notification service. This registration data may also indicate the various predetermined contacts specified by respective subscribing users to be notified in the event of an emergency. By way of example, the registration data 111 may indicate profile information regarding the subscribing users and their registered user device(s), profile information regarding affiliated users and user devices, details regarding preferred emergency contacts, etc., including names, user and device identifiers, account numbers, service classifications, addresses, contact numbers, network preferences and other like information. Registration data may be established at a time of initial registration with the emergency notification platform 109 service provider and subsequently updated or modified.

Still further, the emergency notification platform 109 also maintains rule base data 221, which includes parameters and/or metrics for regulating the application of various rules by the rule processing module. By way of example, the rule base data may include acceleration and deceleration threshold data, movement and positional threshold data, proximity threshold data, time interval data, call priority settings data (e.g., which devices and/or people to notify first), message notification types (e.g., SMS, email, call), etc. It is noted that rule base data 221 may be adapted by way of a configuration module 219. Furthermore, it is noted that the rule base data 221 may be referenced by the rule processing module 217 for triggering execution of notification messages based on travel path data 211, e.g., stored address and position data.

In one embodiment, an information retrieval module 215 receives acceleration and position information as generated or detected by a user device of a subscriber to the emergency notification platform 109 on a periodic basis. By way of example, the information retrieval module accesses the various data required for enabling a rule processing module 217 to determine whether accident and emergency conditions have been met. Under this scenario, when conditions have been met accordingly, as established by a rule base 221, the emergency notification platform 109 may proceed to generate notification messages responsive to the conditions. More regarding the function of rule processing module 217 and its relationship with the rule base data 221 is discussed subsequently.

The information retrieval module 215 receives acceleration data for indicating the relative or current speed at which a user device is being traversed along a predetermined or specified travel path. Also, the information retrieval module 215 accesses position information for the user device, which indicates the location, movement or driving patterns experienced by the user device as it traverses the specified travel path. It is noted that the travel path may be specified for a user device through use of GPS technology and other route planning tools. It is further noted that the acceleration data and position data may be generated by the user device through use of various sensors or tracking devices, as well as through back-and-forth communication between the user device and a GPS tracking system.

As indicated, the information retrieval module 215 also retrieves data representative of the desired destination or path expected to be traversed by the user device as it engages with a vehicle. The travel path data may include a starting destination, ending destination, designated detour, identified routes, highways, streets and roads to be traversed, timing information, landmarks, waypoints and coordinates, etc. In addition, the module 215 may retrieve information pertaining to the user and one or more other external users associated with the specified travel path from various external or third party data sources. Data retrieved from such sources may include weather data, traffic data sources, event data sources, news report data and other information that may be useful for determining current or impending emergency, accident or travel conditions. For the purpose of illustration, the information retrieval module 215 maintains the above described information in the travel path database 211.

In one embodiment, a configuration module 219 provides various functions and settings for enabling a user to adapt their notification and emergency messaging rules and settings. By way of example, the configuration module 219 may operate in connection with the user interface module 209 to present options for allowing a user to adapt acceleration (or deceleration) threshold settings, emergency contacts to be notified in the event of an emergency, messaging types to be executed in the event of an emergency (e.g., calls, SMS, email), alarm settings, etc. The configuration module 219 is the means by which a user may adapt their rule base data 221, which in turn affects execution of a rule processing module 217 in how it triggers or automates the message notification process.

The configuration module 219 enables users to add or delete subscribers or manipulate the modes of communication to the subscribers in real time. For example, a user may wish to modify how the emergency notification platform 109 and user device respond to a detected reduction in speed over a short time interval, which may be perceived as an accident condition. Also, the rule processing module 217 can be set to generate a notification message in response to a detected decrease in speed from sixty miles per hour (mph) to zero in less than five seconds (i.e., speed of deceleration). The user may adapt the maximum or minimum speed or time settings in order to affect the sensitivity of the module. For example, they may adjust the rule to 60 mph to 0 mph in 10 seconds to reduce the sensitivity of the platform 109 and/or user device. In this example, the configuration module 219 thus enables a user to modify rule base data 221 for enabling immediate changes to the behavior of the platform 109. As another example, the configuration module 219 may enable a user to establish a rule specifying that if a user device is determined to remain in a fixed location for more than a predetermined period (e.g., ten minutes) rather than proceed along an expected travel path, a notification message is to be generated by the rule processing module 217.

It is noted that the configuration module 219 enables a user to adjust acceleration thresholds and criteria, position thresholds and criteria and other parameters. As mentioned, the configuration module 219 may function in connection with a user interface module 209 for enabling user access through a web browser, web portal application or via an application interface provided by the user device. Generally, as will be discussed further with respect to FIGS. 5A-5E, the configuration settings may be adapted to affect the behavior of the subscribed user device or other user devices to which the subscriber has configuration authority. Also, depending on user requirements and service provider permissions, the subscribing user may configure their own custom rules and settings. Under this scenario, the user may trigger execution of notification messages relative to their own unique driving habits and travel path considerations.

Furthermore, the user may rely on historic travel path data 211—i.e., for themselves and others—as a basis for the establishing rules. By way of example, the user may generate a rule specifying activation of an alarm or notification every ten minutes anytime the user is travelling after one o'clock in the morning, a time for which they are susceptible to sleepiness. As another example, the user may generate a rule for their teenage son that is embarking on a sixteen hour road trip requiring the teenager's mobile phone to automatically call the user's home phone every four hours. Under this scenario, the teen's user device is affiliated with the subscribing user, such as by way of a mutual family plan or linked customer account.

In one embodiment, a rule processing module 217 triggers execution of a particular messaging service in response to detected travel path data 211, such as acceleration and position information. By way of example, the rule processing module 217 compares or analyzes the acceleration and position information against acceleration or position thresholds established in the rule base data 221. Execution of the messaging module 207 or voice call application module 213 is then performed or not based on the comparison results. For example, a deviation between a current position of a user device along a predetermined travel path versus an expected position of the device may trigger execution of a notification message by the rule processing module 217. Under this scenario, the rule processing module 217 triggers execution of the messaging module 207 to generate specific data messages, or execution of the voice call application 213 to generate specific voice based messages.

The format and content of notification messages may vary depending on the context of the rule being applied as well as the parameters indicated in the rule base data 221. The rule processing module invokes the appropriate notification message, by way of the messaging module 207 and voice call application 213, relative to the rule being applied. It is noted that the rule processing module may be implemented as one or more algorithms for be determining and responding to travel path or course deviation conditions, determining and responding to accident conditions, determining and responding to emergency conditions, determining and responding to road or weather conditions, etc. It is further noted that the rule processing module 217 may execute various algorithms for processing historic travel path data relating to a subscribing user or other users associated with a given travel path of the user.

As mentioned above, a messaging module 207 provides messaging services in support of emergency communications initiated by the devices 101a-101d, according to an embodiment. By way of example, the messaging module 207 may be configured to generate control signals for transmission to a user device 101 utilizing any suitable bearer. This may include one or more call control setup messages, short messaging service (SMS) messages, enhanced messaging service (EMS) messages, multimedia messaging service (MMS) messages, electronic mail, files, or any other suitable bearer, as well as any suitable combination thereof. In particular implementations, these bearer mediums may include control signals in various forms, including attention (AT) commands, menu traversal paths, function codes, voice data, dual-tone multi-frequency (DTMF) signals, scripts, strings, parameters, object variables, and the like.

It is noted that these control signals can be used in lieu of "software code," and therefore, may be directly integrated into the control logic of mobile device 101a, thereby requiring less processing and hence, less power. It is contemplated, however, that coded instructions may also be utilized. Furthermore, if the caller subscribes to a content delivery service (e.g., Fiber-Optic Television (FIOS)), in addition to the call being routed to the PSAP or other designated contacts, emergency notification messages can also be broadcast through the data network 113 (e.g. Internet). Of note, the messaging module 207 is configured to generate or prompt the generation and presentment of messages at a user device 101 according to one or more of the above described techniques. While the messages may vary depending on the information retrieved by module 215 or due to established rule base data 221, the messages may inform the user or the predetermined destination (receiving user) of an accident or emergency occurrence and details associated therewith.

Also as mentioned above, a voice call application 213 may execute or generate a signal for enabling a voice call to be placed to a predetermined destination (e.g., contact), according to one embodiment. The predetermined destination may include a PSAP 107, a mobile phone belonging to a spouse, an STB or a neighbor or other designated user and receiving device. By way of example, the voice call application 213 may initiate a phone call after a failed response to a text based notification message. In this manner, the initiating user may verbally provide details regarding the emergency situation at hand. Alternatively, the voice call application 213 may be configured to generate automated messages (e.g., robotic or voice automated speech) for conveying vital information in assisting with the emergency condition experienced by the calling party. The rule processing module 217 may operate in connection with the voice call application 213 for informing the message type to be presented by the voice call application 213. It is noted that the voice call application 213 may also access the registration data 111, travel path data 211 and addressing information 119 for expressing the identity and the location of the caller to assist in handling the emergency call. Data from these repositories may be presented to the receiving user device by way of voice or data messaging in conjunction with the call.

In one embodiment, a user interface module 209 provides a user interface, e.g., web portal or other networked application, to permit a subscribing user to access the features and functionality of platform 109 via devices 101a-101d. According to certain embodiments, user interface module 209 may be configured via a web browser or other network-based application or system, such as a voice browser or interactive voice recognition system. This capability permits users, for instance, to directly activate their devices to enable generation of notification messages in response to accident or emergency conditions. Still further, the user may register devices and users as one or more predetermined contact destinations for directing the notification messages to.

In one embodiment, one or more controllers (or processors) 203 for effectuating the aforementioned features and functionality of the emergency services of system 100, as well as one or more memories 205 for permanent and/or temporary storage of one or more of the aforementioned variables, parameters, information, signals, etc. In this manner, the features and functionalities of emergency messaging may be executed by controller(s) 203 and/or memories 205, such as in conjunction with one or more of the various components of platform 109. The one or more controllers 203 may also operate in conjunction with the messaging module 207 to control the messaging capabilities of the emergency notification platform 109. By way of example, the rate at which messages are transmitted to various user devices, be they initiators or recipients of notification messages, may be adapted by the controller 203. As another example, the controller 203 may manage a response countdown timer that triggers execution of additional notification messages by the messaging module 207 or emergency phone calls by a voice call application 213.

In one embodiment, the various protocols, data sharing techniques and the like required for enabling collaboration over the network between user devices 101a-101d, other GPS or wireless enabled communication devices and the emergency notification platform 109 is provided by a communication interface or module 201. As the various devices may feature different communication means, the communication module 201 allows the emergency notification platform 109 to adapt to these needs respective to the required protocols of the communication network 105. In addition, the communication module 201 may appropriately package data for effective receipt by a respective user device, such as a mobile phone or set-top box. By way of example, the communication interface 201 may package the various data maintained in repositories 211, 111, 119 and 221 for enabling shared communication and compatibility between different types of devices.

In one embodiment, the platform 109 may communicate directly with one or more switches (not shown) within the telephony network 117, or may be integrated with the telephony signaling network as an intelligent peripheral or processor, for instance. Also, while not shown, the emergency notification platform 109 may interact with using global positioning satellite receivers, Geographic Information Systems (GIS), environmental data management systems and multimedia databases for enabling tracking of user devices.

In FIG. 2B, a user device 250, which may be a mobile device (e.g., mobile device 101b of FIG. 1), set-top box 101c, or a computer 101d, includes a notification presentation module 251 that is configured to present a text-based notification message. The user device 250 may also include a voice module 253 configured to establish a voice-based call. Such voice-based call can be traditional plain-old-telephone service (POTS) calls or packetized voice calls (e.g., VoIP). These communication sessions can occur concurrently during an emergency call. It is noted that these communication sessions can be established over a circuit-switched network, a packet-switch network, or a combination thereof. Thus, a communication interface 255 can be appropriately configured depending on the transport systems and networks. Furthermore, the communication interface 255 may provide a means of collaborative data exchange and communication between the user device 250 and the emergency notification platform 109.

Although only a single interface 255 is shown, it is noted that multiple communication interfaces may be utilized, depending on the technologies involved. Moreover, the user device 250 employs a user interface module 257 to enable control by the user of the device of the various communication sessions. By way of example with respect to FIGS. 5A-5E, the user interface module 257 provides a graphical user interface (GUI) for enabling user interaction with the device and/or the emergency notification platform 109. Additionally, a controller 259 is configured to coordinate the concurrent communication sessions provided by the notification presentation module 251 and voice module 253. For example, the controller 259 generates the appropriate signals to control the communication interface 255 for transmissions over the voice channel and the messaging channel.

The controller 259 may also be configured to enable control of the sound and power settings associated with the user device 250 respective to notification messages. For example, the controller 259 may cause generation of control signals and instructions for manipulating the sound settings of the device in response to a received notification message. Preferred user specified settings (which may also be set using default values) may be established at the emergency notification platform 109, such as by way of the configuration module 219. By way of this approach, if the device is currently in a vibration mode or muted, the notification message may also prompt the controller to override the current settings to ensure audible alerts. Similarly, the controller 259 may adapt power settings responsive to notification messages being received or generated.

In one embodiment, the user device 250 may also feature an acceleration detection module 257 and position detection module 261. The acceleration detection module 257 is a device that measures proper acceleration of the user device 250. While implementations may vary, the acceleration detection module 257 may be configured to detect magnitude and direction of the acceleration (as the user device moves along the travel path within a moving vehicle) as a vector quantity. Generally, the acceleration detection module 257 may also be used to sense device orientation, vibration shock, falling of the device and sudden impact. The acceleration detection module 257 gathers acceleration information pertaining to the user device and provides this data to the emergency notification platform 109, e.g., by way of the communication interface 255, where it is subsequently maintained as travel path data 211. As mentioned previously, an acceleration value that meets the conditions, parameters or criteria established by a rule base 221 may be sufficient for triggering a notification message.

In one embodiment, a position detection module 261 estimates the current location, position or movement of the user device using global positioning satellite receivers, Geographic Information Systems (GIS), or other positioning techniques. By way of example, the position detection module 261 may generate spatiotemporal data, such as for conveying a particular positional moment in space and time for the user device. Under this scenario, the position detection module may interact with the emergency notification platform 109 in order to convey or generate position information that is representative of the user device's relative change in location, position or perspective from moment-to-moment.

While specific reference is made to the above described implementation of the user device 250 and emergency notification platform 109, it is also contemplated that platform 109 may embody many forms and include multiple and/or alternative components. For example, it is contemplated that the components of platform 109 may be combined, located in separate structures, or separate locations. Of note, the various functions and operations of the emergency notification platform 109 may be performed by the user devices 101 directly. For example, the user device 250 may be configured to operate a rule processing module 217 for enabling direct processing of position and acceleration information. As another example, the user device 101 may also operate a configuration module 219 for enabling a user to customize the processing rules and thus impact the automated notification and alert messaging behavior of the device 101. Under this scenario, the configuration settings can be passed on to the emergency notification platform 109 and maintained in association with the subscribing user as rule base data 221.

Implementation approaches may vary depending on various factors, including device processing capabilities, service provider implementation preferences, etc., it is noted that mutual operation of various emergency notification processes by the user device 101 and emergency notification platform 109 is particularly well suited for responding to adverse accident and emergency conditions. For example, in instances where the mobile device 250 is damaged or rendered inoperable due to the occurrence of an accident (e.g., a vehicle crash), the emergency notification platform 109 may perform computation of the available acceleration and position data. As another example, in the absence of the user device 250, the user may adapt their (and other's) configuration settings and rules via a web based interface to the emergency notification platform 109. Still further, both the emergency notification platform 109 and user device 101 may be configured to collaborate with other GPS enabled devices to gather intelligence for determining emergency situations more accurately. As such, position and acceleration data detected by multiple devices may be compared, averaged, modeled, vector processed, etc. to by the rule processing module 217. The collaboration process may be carried out by way of any range based communication protocol, including Bluetooth or wireless local networking. It is noted that intra-device collaboration between devices within close proximity of a traffic event, accident or emergency may be particularly effective for providing notification messages intended to thwart impending hazards, chain reaction accidents, vehicle pileups, etc.

Figure 3B:
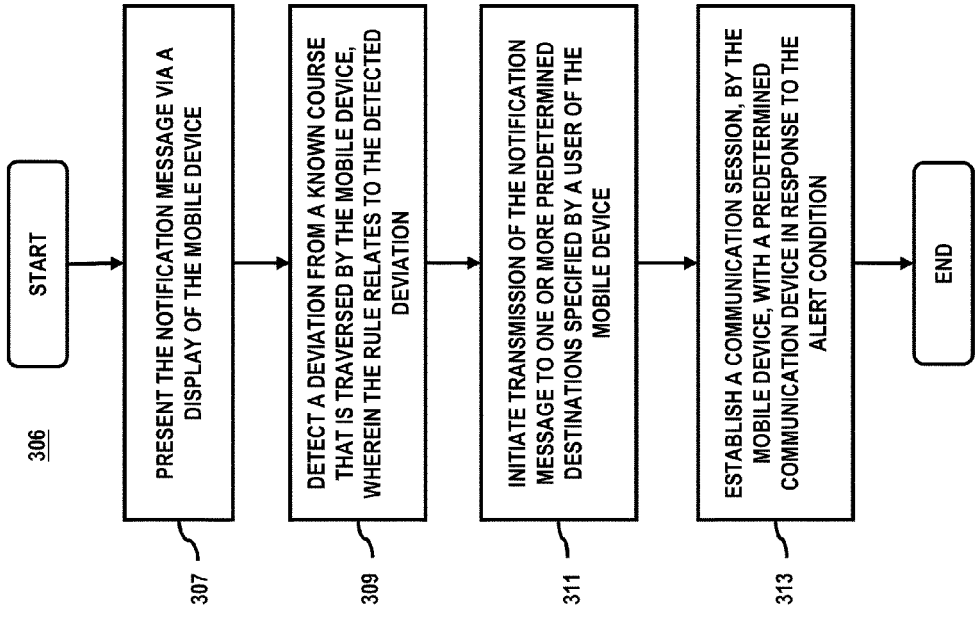
FIGS. 3A-3C are flowcharts of a process for configuring a mobile device to enable accident detection and notification functionality for use within a vehicle, according to one embodiment.
Figure 3A:
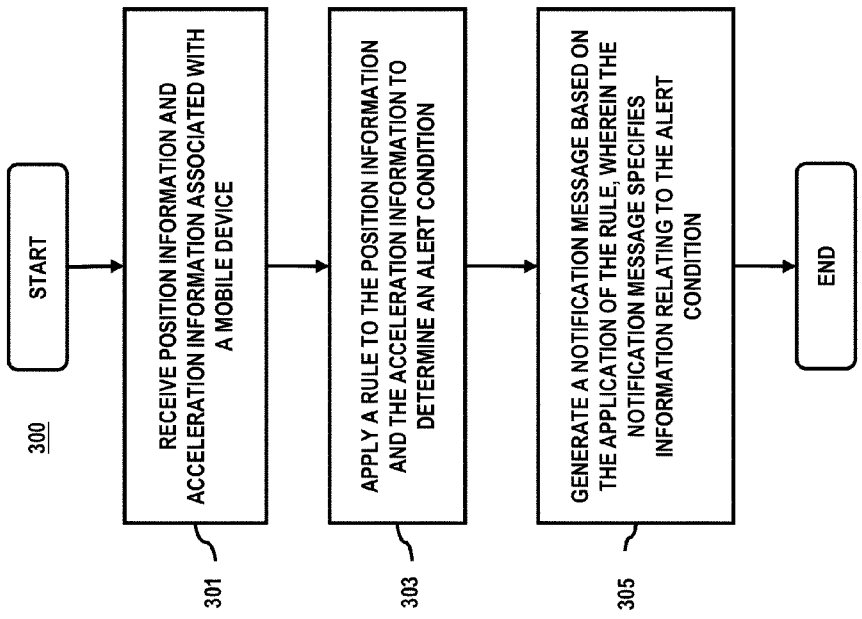
Figure 3C:
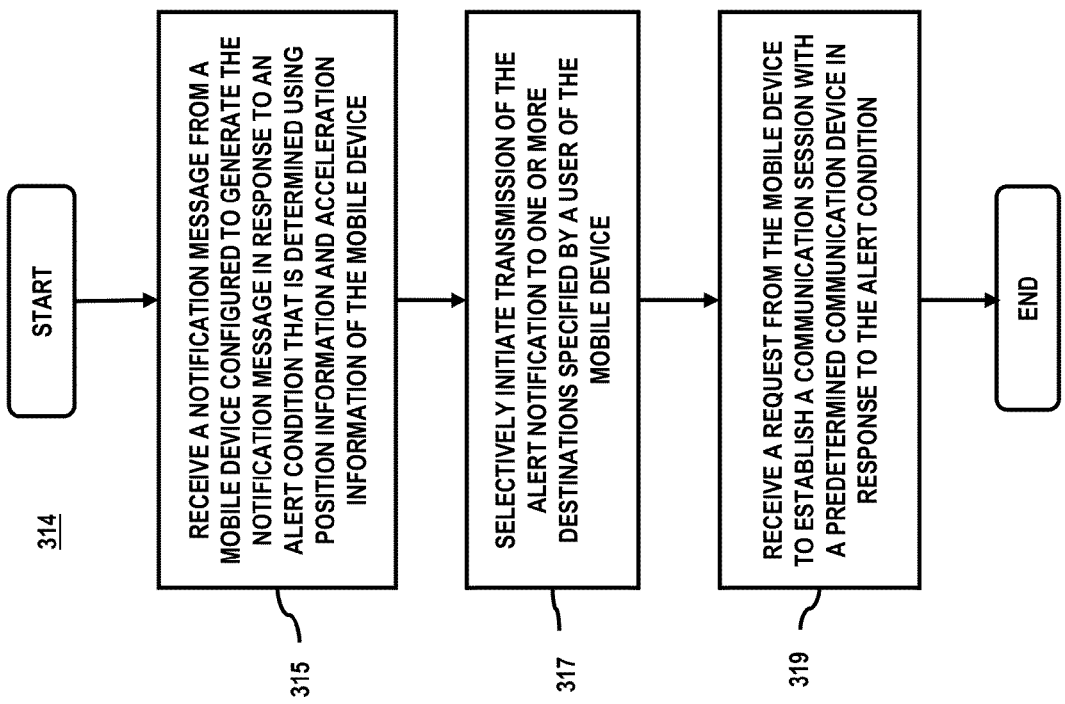

FIGS. 3A-3C are flowcharts of a process for configuring a mobile device to enable accident detection and notification functionality for use within a vehicle, according to one embodiment. For the purpose of illustration, the processes are described with respect to FIG. 1. It is noted that the steps of the process may be performed in any suitable order, as well as combined or separated in any suitable manner. In step 301 of process 300, position information and acceleration information associated with a mobile device (e.g., user device 101) is received. By way of example, this information is received by the emergency notification platform 109 in response to the collecting of such data by the mobile device. In another step 303, a rule is applied to the position information and the acceleration information to determine an alert condition. As mentioned, the emergency notification platform 109 processes the received information based on one or more algorithms as well as established rule base data. Per step 305, a notification message is generated based on the application of the rule. In one embodiment, the notification message specifies information relating to the alert condition. The rule, for example, may specify a threshold level for degree of severity of the accident condition or the emergency condition.

As shown in FIG. 3B, per steps 307 and 309 of process 306, a notification message is presented via a display of the mobile device and a deviation from a known course that is traversed by the mobile device is detected. Such notification message may be presented in form of a textual message, a visual indicator, an audio indicator, or any combination. As mentioned previously, the emergency notification platform 109 may perform a comparison of established position and acceleration threshold data, such as maintained as rule base data, to real time measures of such data. The applied rule may therefore relate to the detected deviation. In another step 311, a notification message is initiated for transmission to one or more predetermined destinations specified by a user of the mobile device. As mentioned, the predetermined destinations may include one or more mobile devices, telephones, computers, set-top boxes or communication systems belonging to designated emergency contacts, including local law enforcement agencies, family and friends.

In another step 313, a communication session is established by the mobile device with a predetermined communication device in response to the alert condition. As noted above, the emergency notification platform 109 may be configured to cause generation of a call or data based communication session with the device of the designated emergency contact. During this communication session, the user of the mobile device may speak with the emergency contact. Alternatively, the emergency notification platform 109 may convey a voice based message or other means of communication to the emergency contact on behalf of the user.

In step 315 of process 314 (of FIG. 3C), a notification message is received from a mobile device configured to generate the notification message in response to an alert condition. As suggested, the alert condition is determined using position and acceleration information associated with the mobile device. In step 317, the receiving mobile device may selectively initiate transmission of the alert notification to one or more destinations specified by a user of the initiating mobile device. By way of this approach, the receiving mobile device acts as a medium for transmission of notification messages on behalf of the initiating device, such as when the initiating device is damaged or unable to operate properly. Also, the receiving mobile device may proceed to initiate contact with a PSAP 107. In another step 319, the receiving mobile device receives a request from the initiating mobile device to establish a communication session with a predetermined communication device in response to the alert condition. The communication session may be implemented to support a voice based call.

Figure 4:
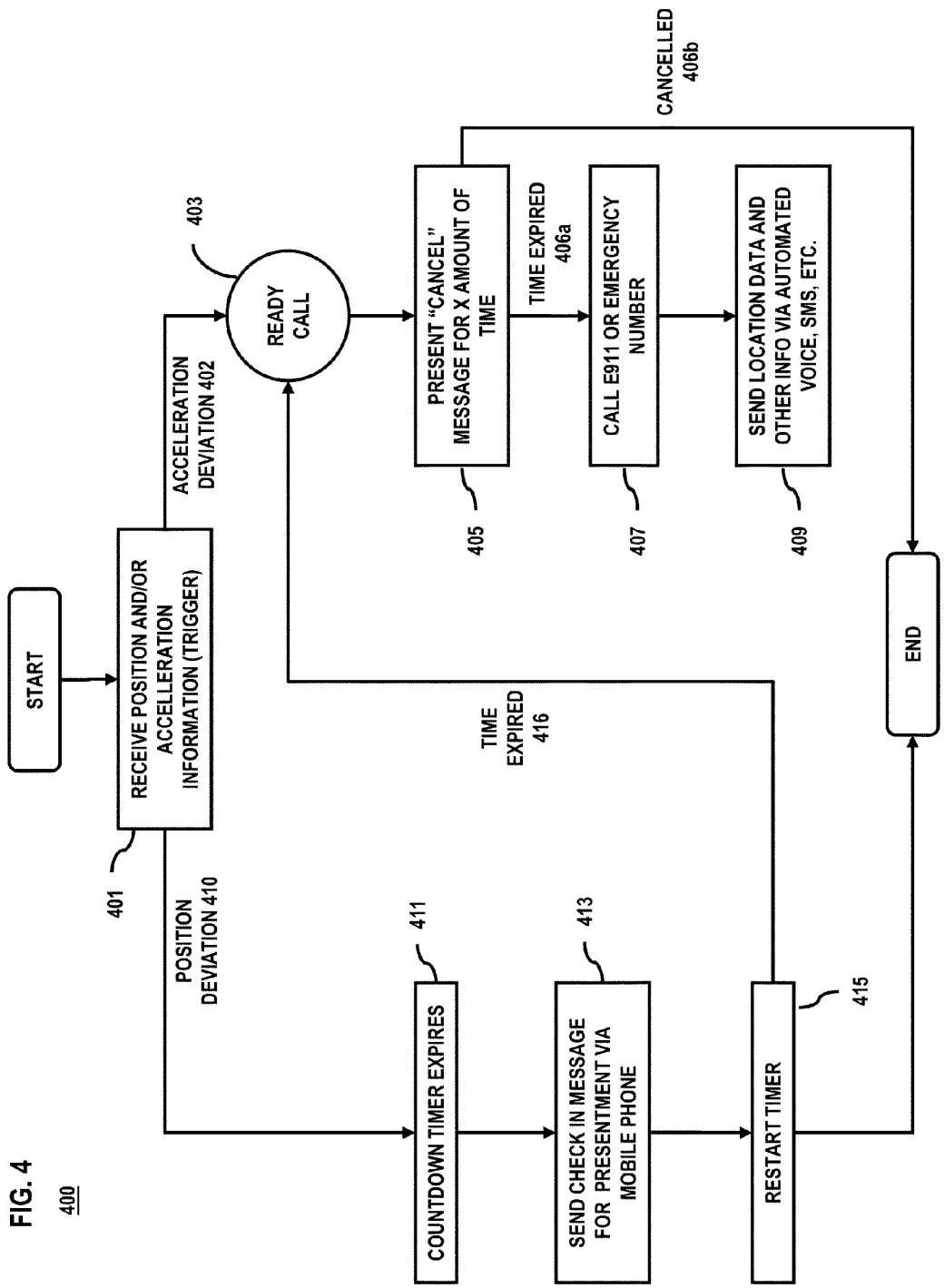
FIG. 4 is a flowchart of a process for responding to an accident or emergency condition associated with a vehicle by way of a mobile device, according to one embodiment.

FIG. 4 is a flowchart of a process for responding to an accident or emergency condition associated with a vehicle by way of a mobile device, according to one embodiment. FIGS. 5A-5E are diagrams of a graphical user interface (GUI) for presenting an emergency notification and for configuring a mobile device (e.g., user device 101a) to enable accident detection and notification functionality, according to various embodiments. For purposes of illustration, these figures are presented from the perspective of various exemplary use case scenarios pertaining to user subscribed with the emergency notification platform, such as by way of their mobile device service provider. It is assumed therefore, that the mobile device 101a is configured to interact with the emergency notification platform 109 as shown in FIG. 1 and FIG. 2; so that the mobile device is configured to execute one or more emergency notification features. Under this scenario, the mobile device is further associated with a designated travel path corresponding to the movements and activities of the vehicle. The steps of the process 400 may be performed in any suitable order, as well as combined or separated in any suitable manner.

In step 401 of process 400, the emergency notification platform 109 receives position and/or acceleration information. Depending on the value of the acceleration reading or the degree to which the position deviates from the designated travel path, a response may be triggered by the emergency notification platform 109 for affecting operation of the mobile device 101a. In response to an acceleration value that deviates from an established threshold per step 402, the platform 109 readies the mobile device 101a, such as shown in FIGS. 5A-5B, 5D-5E, to ready (e.g., queue) a call to one or more predetermined destination contacts. This corresponds to step 403. In step 405, a notification message is presented to the user by way of a GUI of the mobile device, the message indicating that the call will be made in a period of time x (e.g., x=10 seconds) if the user does not cancel.

Figure 5A:
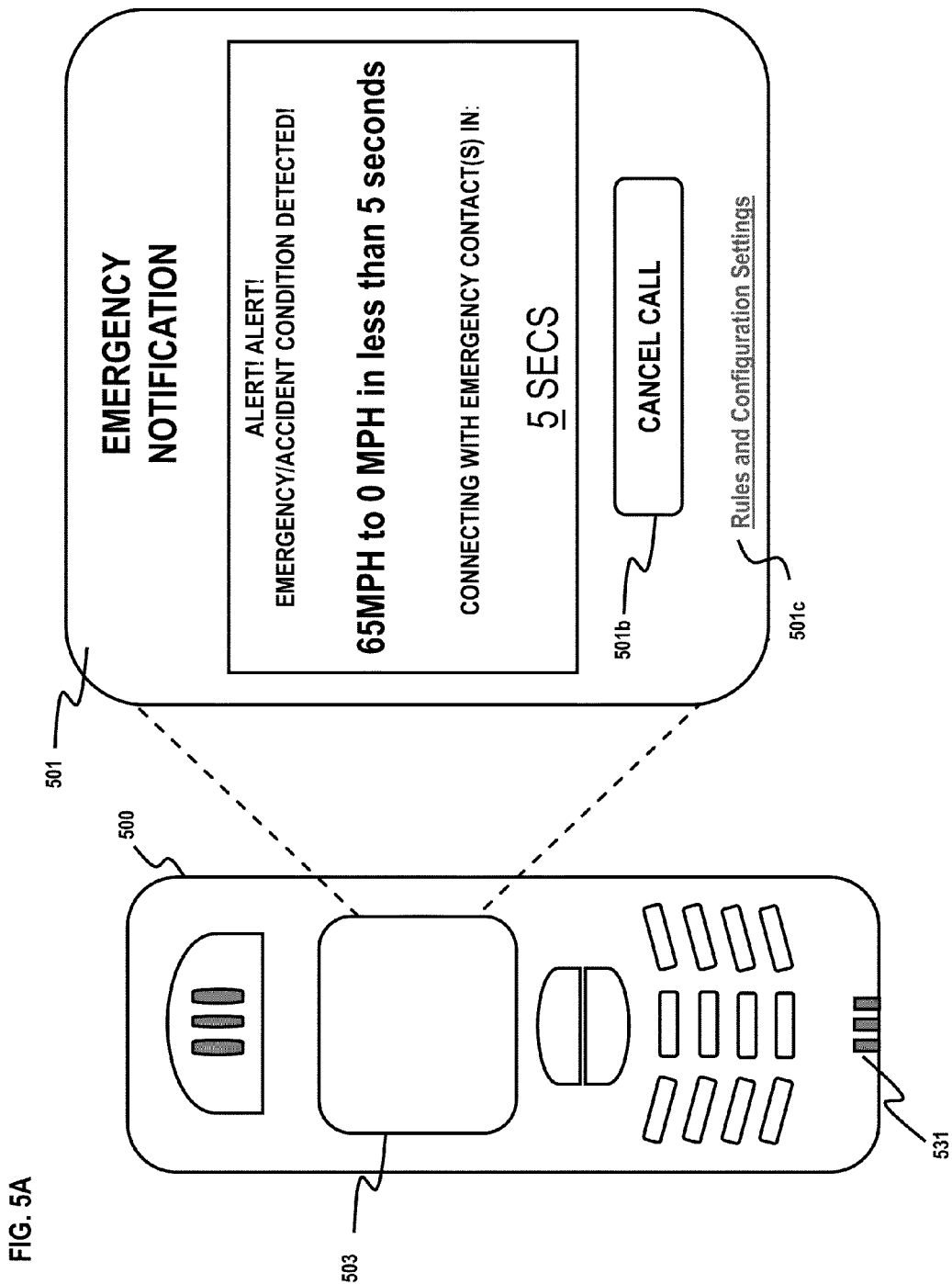
FIGS. 5A-5E are diagrams of a graphical user interface (GUI) for presenting an emergency notification and for configuring a mobile device to enable accident detection and notification functionality, according to various embodiments.

By way of example, FIG. 5A presents emergency notification message 501 to the graphical user interface 503 of the device 500. In this example, the message indicates that an emergency condition was detected, specifies the perceived emergency condition (e.g., "65 MPH to 0 MPH in less than 5 seconds"). The message 501 also indicates a countdown sequence or time period x in which the device 500 will automatically connect with the predetermined destination(s).

The user has the option of cancelling the call by activating a "Cancel Call" button 501b as presented to the interface 503. By activating this button 501b, the emergency notification process is terminated, as in step 406b. Alternatively, when the time period x expires, a call may be automatically placed to the designated emergency contacts, such as 911, a spouse, etc., corresponding to step 407. In another step 409, location data and other pertinent information pertaining to the emergency situation may also be provided to the designated contact via automated voice, SMS, email, etc.

Figure 5B:
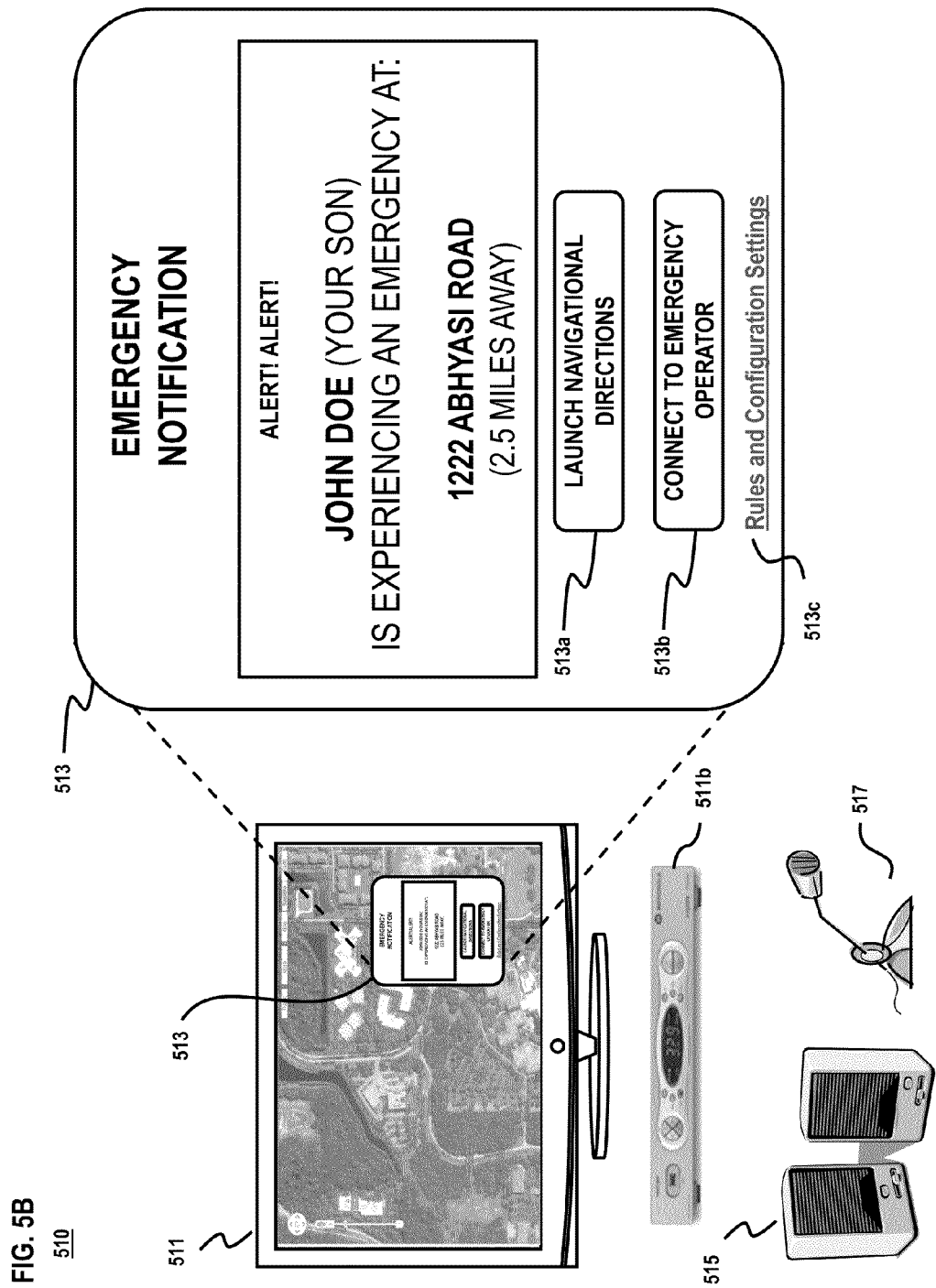

FIG. 5B presents an exemplary predetermined destination device for receiving notification messages and communications from the mobile device. By way of example, the predetermined destination is a set-top box (STB) 510 belonging to a relative (e.g., Father) associated with the user of the mobile device that initiated the notification message. The STB 510 is presented as a integrated system that includes a display device 511, a content processing device 511b (e.g., high definition television (HDTV) receiver), home entertainment theatre, etc.) 513, a speaker system 515 and microphone 517; the STB 500 being suitably configured to a communication network (e.g., service provider network 115, data service network 113) for receiving voice or data based communications. Responsive to steps 407 and 409, the display device 511 of the STB 510 is prompted to present the notification message as a pop-up message 513. Under this scenario, the notification message 513 indicates the user associated with the accident or emergency (e.g., the recipient's son), location information corresponding to the accident (e.g., 1222 Abhyasi Road) and an indication of the distance from the recipient's location to the location of the accident or emergency (e.g., 2.5 Miles). In the case of a received phone call, the STB 510 may activate the microphone 517 and speaker system 515 for enabling voice based communication over a public switched telephone network connection, digital subscriber line connection, integrated services digital network connection, or the like.

It is noted that the recipient is registered or recognized by the emergency notification platform 109 as an emergency contact associated with the initiating user John Doe. Likewise, the STB 510 is specified as well. Consequently, the emergency notification platform 109 collaborates appropriately with the STB 510 for enabling the overlay of notification messages 513 atop content currently being viewed by the recipient. Depending on the capabilities of the STB, the emergency notification platform 109 may also override currently displayed content in response to a received emergency notification message—i.e., present a full view of the message 513 to the display 511. Furthermore, additional buttons 513a and 513b may be presented for activating by the user of the STB 510 along with the notification message 513, such as for launching a map detailing the location of or directions to the site of the emergency or accident. Also, a button may be presented for enabling the user of the STB 510 to place a call to an emergency responder, such as on behalf of the initiating user (e.g., John Doe).

In response to a determined deviation in position, as in step 410, additional processes may be performed by the mobile device 500 of the initiating user based on interaction with the emergency notification platform 109. Position deviation may be the result of erratic driving patterns, inappropriate lane crossings, off route driving and other conditions. The platform 109 therefore, upon expiration of a designated countdown period at step 411, generates a control signal for prompting the mobile device to present a check in message to the user. This corresponds to step 413, and is shown by way of example with respect to FIG. 5C. The check in message 519 is presented to the user interface 503 of the mobile device 500 for indicating that a course deviation was determined. The message may also prompt the user to respond to a "Are you OK" message, as well as present a countdown timer or time period x in which the user may respond. Activation of the countdown timer corresponds to step 415.

By way of example, the user is able to respond to the message by activating an "I'm OK" button 519a. Alternatively, the user may activate a "Change Course" button, which initiates execution of a GPS tool or other route planning application available to the device 500. The course change option allows the user to modify their travel path in real-time, which in turn, enables the emergency notification platform 109 to adapt accordingly. By specifying an updated or new travel path (e.g., destination or detour), such as that which corresponds to the current location, position or movement of the device 500, the emergency notification platform 109 may refrain from causing presentment of notification messages to the interface 503. Likewise, by activating the "I'm OK" button, the platform 109 is made aware that the user device 500 is engaged in a temporary deviation from its due course. It is noted that the countdown timer of step 411 may be purposed for designating a limited period of time (e.g., 4 minutes) in which the platform 109 does not respond to course/position deviation for the sake of enabling the user/driver to proceed accordingly.

Alternatively, when the time period x (e.g., 25 seconds) expires prior to user selection of an action button 519a and 519B, corresponding to step 416, the emergency notification platform 109 proceeds with steps 403a-409. As such, a call may be automatically placed to the designated emergency contacts, such as 911, a spouse. It is noted that failure to respond to the check in message caused for presentment to the device 500 results in automated emergency and notification response action being invoked by the platform 109. Also, while not shown, notification messages may also be generated on the basis of current position information for informing the user of impending traffic conditions, accidents or emergency events. For example, a notification message may be generated in response to a determination that the user device 500 is approaching the scene of a traffic pileup. In this case, the user may be warned to slow down or take an alternative route to avoid an impending collision. As another example, the position of an erratic driver along the same travel path of the user may be presented as a notification message for warning the user. It is noted that the mobile device may interact with the notification platform 109 to enable adaptation of the vehicle, including generating a signal for controlling the engine, steering wheel and breaks.

Figure 5C:
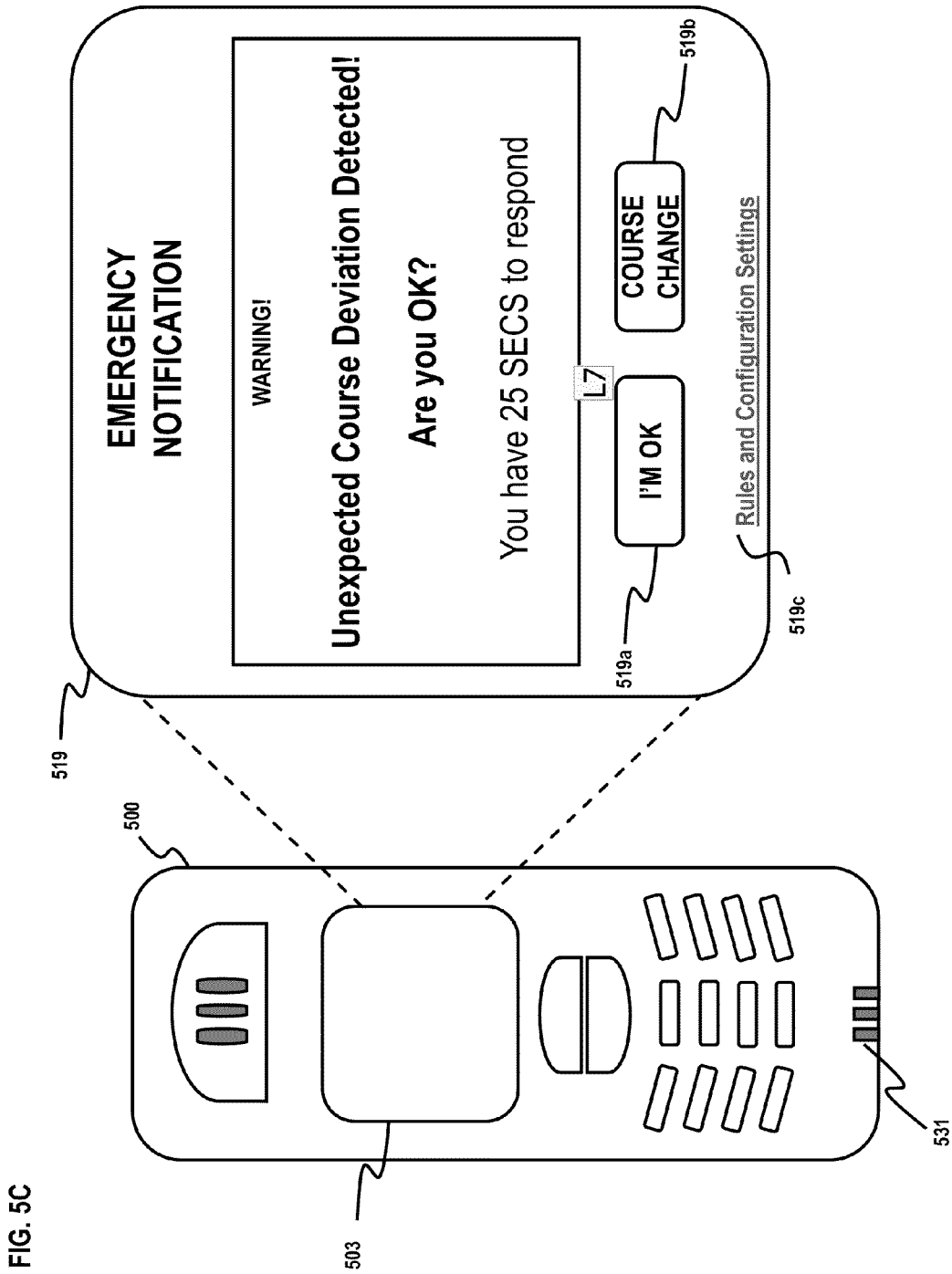

In FIGS. 5A-5C, the user interface presents various action buttons for enabling user interaction with the event notification platform and for enabling various emergency and accident detection and prevention features. Another feature available to the user, as shown, is a "Rules and Configuration Settings" link 501c, 513c and 519c, which is presented with respective notification messages 501, 513 and 519. By activating this link, the mobile device 500 or STB 510 is caused to present a rules and configuration settings interface to the user. Depictions of the rules and configuration settings interfaces for adapting acceleration rules and notification rules are shown by way of example with respect to FIGS. 5D and 5E. It is noted, however, that various additional configuration interfaces, including for adapting position settings, third party data source access preferences and other features available to the user by way of system 100 may be provided by the event notification platform 109. For illustration purposes, the figures are described with respect to the event management platform 109 of FIG. 2.

Figure 5D:
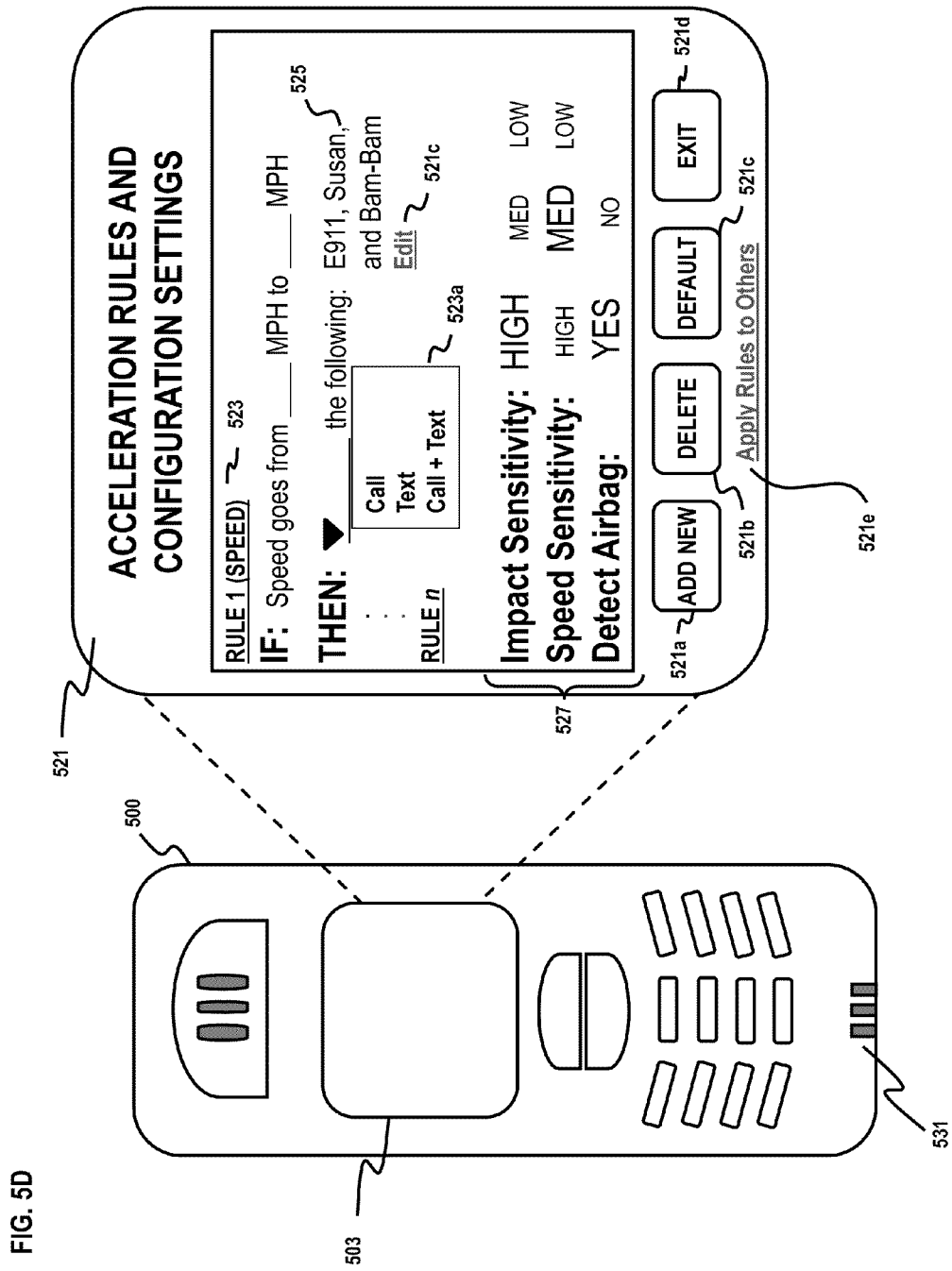

In FIG. 5D, the acceleration rules and configuration settings 521 enable the user to manipulate rule base data for impacting the processing and message notification triggering capabilities of the rule processing module 217. For example, a first rule (RULE 1 523) provides for the following:

IF: Speed goes from_____MPH to_____MPH
THEN: _____the following:

In this case, the "IF" condition indicates a rule to be applied by the rule processing module 217 109 when analyzing received acceleration information. The blank lines represent data entry fields wherein the user may indicate specific speed values, which in turn establish rule base data 221. The "THEN" parameter indicates the action (e.g., notification action) to be triggered by the rule processing module 517 in response to satisfactory fulfillment of the "IF" condition.

By way of example, assume the user enters "65" and "0" in the first and second data entry fields of the "IF" condition. Further assume the user sets the "THEN" parameter to "Call+Text" such as by way of a drop down menu 523a, as well as indicates one or more designated contacts 525. According to this scenario, the device 500 will be caused to generate a call or text based notification to a predetermined destination for "E911" (e.g., PSAP 107), "Susan" and "Bam-Bam" whenever the speed of the user device 500 is determined to go from 65 MPH to 0 MPH. Optionally, a time setting may also be associated with the "IF" condition for further adapting the response of the emergency notification platform 109 and ultimately the device to the perceived condition being met. Additional rules may also be added or deleted through activation of the "ADD NEW" or "DELETE" action buttons 521a and 521b respectively. Alternatively, the user may activate default rule settings and parameters by activating the "DEFAULT" action button 521c.

Still further, the user may also adapt one or more sensitivity settings 527 of the mobile device and/or responsiveness of the event management platform 109. For example, an "Impact Sensitivity" may be set to "HIGH" for affecting the responsiveness of the mobile device and/or event management platform 109 to detected impact data. In another example, a "Speed Sensitivity" may be set to "MED" (medium) for reducing the degree of responsiveness of level of severity of detected variations in speed. Such an approach may be suitable for a driver desiring to engage in a long road trip, where they may be prone to differing speed limits along the way. In yet another example, a "Detect Airbag" setting may be set to yes for enabling the user device and/or event management platform 109 to detect an airbag deployment signal. Upon adapting these settings, the user may activate an "Exit" action button 521d.

It is noted that the contact names in this example include aliases or nicknames rather than whole or complete names. This is presented by way of example to illustrate the robust interoperability between the platform 109 provided interface, and other applications available to the mobile device 500. For instance, emergency contacts may be added by way of an "Edit" link 523b, which in turn guides the user to a contact management application residing on the phone. Alternatively, the "Edit" link 523b may activate a contact management tool maintained via a social networking service, or any other tool available for access over a communication network.

Figure 5E:
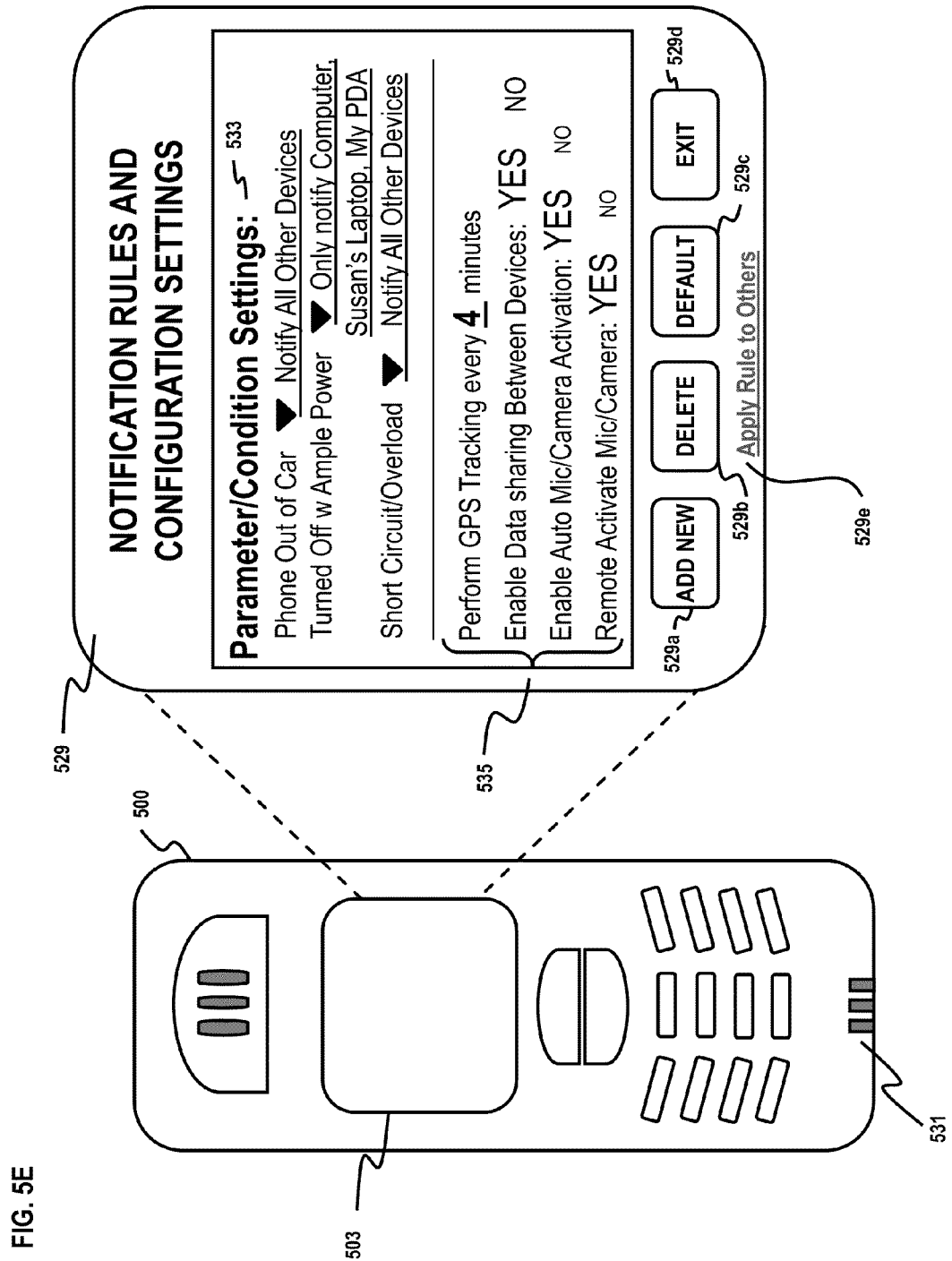

In FIG. 5e, the notification rules and configuration settings 529 enable the user to manipulate rule base data for impacting the message notification process of the mobile device 500. For example, the "Parameter/Condition" settings 533 as shown indicate the following:

Notify "All Other Devices" IF the phone is determined to be outside of the vehicle (e.g., the device is thrown out of the vehicle accidentally or as a result of a crash). In this case, "All Other Devices" pertains to all devices and users defined as part of a group of predetermined destinations for directing notification messages when the "IF" condition is satisfied;

Only notify "Computer," "Susan's Laptop" and "My PDA" IF the phone is determined to be turned off with an ample power supply. In this case, only a select few devices and users are defined as predetermined destination for directing a notification message when the "IF" condition is satisfied;

Notify "All Other Devices" IF the phone is determined to experience a short circuit/power overload (e.g., the device makes contact with water accidentally or as a result of a crash). As before, in this case, all predetermined destinations are notified upon satisfactory fulfillment of the "IF" condition. Functionally, the device may be configured to send a distress signal to the event management platform 109 for alerting it to interact with other registered devices due to the power/short circuit condition.

Additional "Parameter/Condition" settings 535 available to the user may include settings for configuring the rate at which GPS tracking is performed, settings for enabling data sharing between GPS enabled devices, settings for enabling automatic and remote activation of the integrated microphone/camera of the device in the vent of loss, vehicle theft, kidnapping, or other emergency situations. Also, as before, the user may also add new rules, delete rules, select default settings (e.g., those sanctioned by the service provider), or exit the configuration interface by way of action buttons 529a-529d respectively. Still further, a "Apply Rule to Others" link 521e and 529e may be provided in connection with the configuration interface 521 and 529 respectively for enabling the established rules and settings to be applied to other users and devices. By way of example, a subscribing user to the event management platform 109 may apply the "Parameter/Condition" settings 535 as shown to any other user to which they are linked, such as by way of a joint contract, family plan, business plan, etc.

It is noted that the above described user devices, in the form of mobile device 500 or STB 510 may be configured for operation by way of touch, remote control or voice. For example, the STB 510 may feature a touch based screen for enabling activation of the various action buttons 513a and 513b. Alternatively, the action buttons may be invoked by way of a keypad, keyboard or remote control. As another example, the user may activate certain notification messaging options and features through use of a Bluetooth device, microphone 517 or by speaking into the transmitter/microphone 531 of the handset 500. In other instances, the mobile device 500 may be controlled by way of an integrated keypad, control buttons Regardless of implementation, the notification messaging and communication process may be carried out automatically by the designated device 500/510, such as to accommodate situations where the user in distress is unable to respond or to expedite the overall emergency response process.

The described processes, according to certain embodiments, provide a number of advantages. For example, the mobile devices may be readily configured to respond to emergency situations instead of requiring specialized equipment to be placed in the vehicle. Also, a user is able to establish and configure their own rules and settings for affecting generation of notification messages to predetermined destinations. Additionally, the approach permits the user to be automatically warned of potential hazards such as pile ups and hazardous driving conditions that may occur along a predetermined travel path. Further, such capability can be provided in a large number of transportation environments, irrespective of the safety mechanisms (or lack thereof) associated with the vehicles involved.

The processes described herein for providing emergency notifications may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
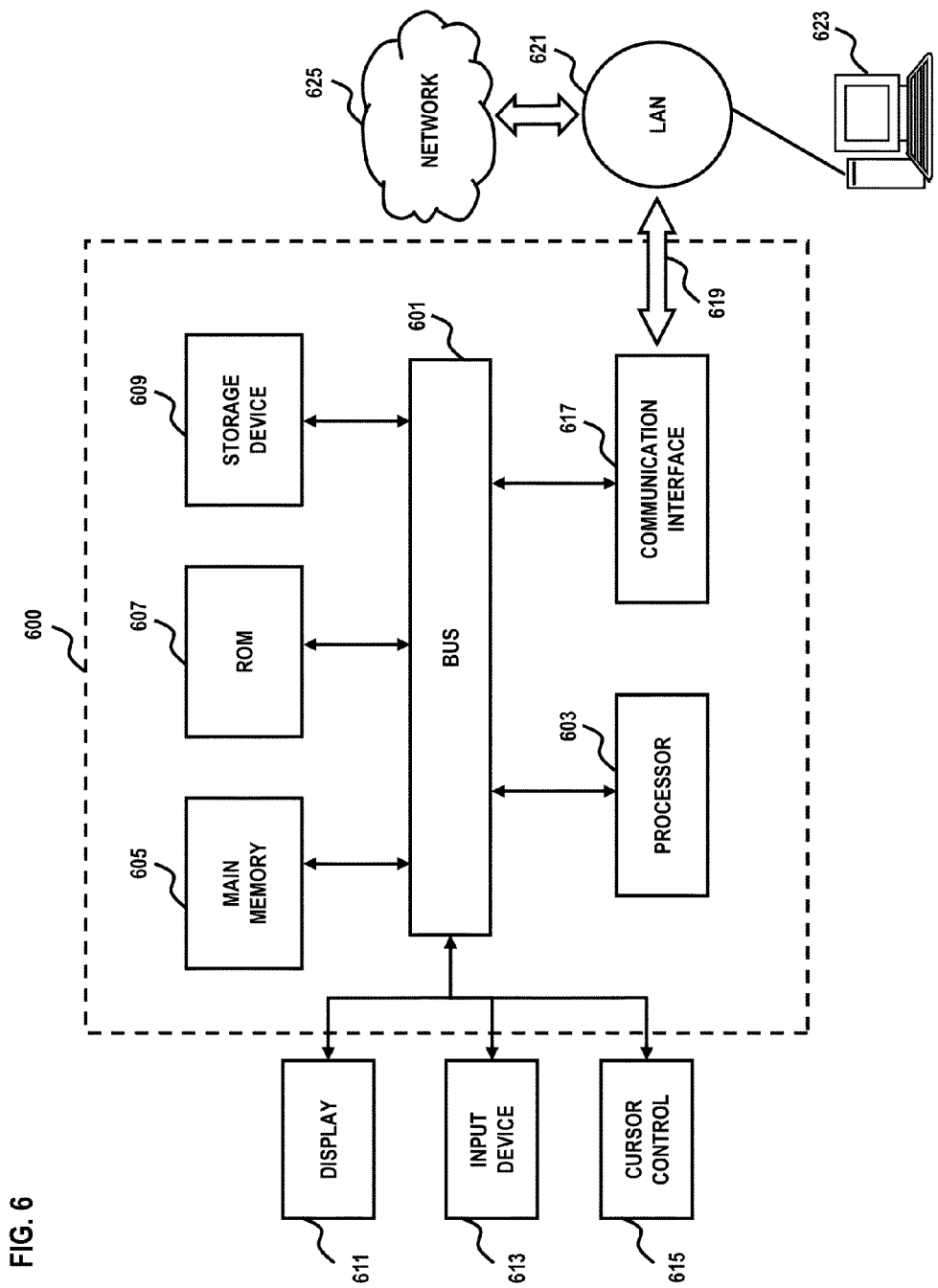
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 5, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
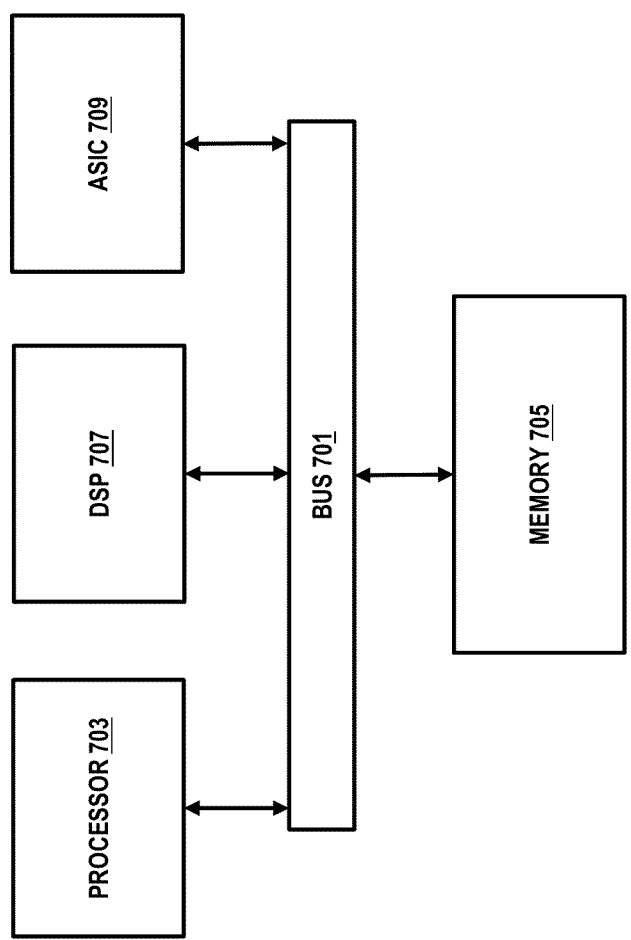
FIG. 7 is a diagram of a chip set that can be used to implement an embodiment of the invention.

FIG. 7 illustrates a chip set or chip 700 upon which an embodiment of the invention may be implemented. Chip set 700 is programmed to configure a mobile device to enable accident detection and notification functionality for use within a vehicle as described herein and includes, for instance, the processor and memory components described with respect to FIG. *~ incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of configuring a mobile device to enable accident detection and notification functionality for use within a vehicle.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to configure a mobile device to enable accident detection and notification functionality for use within a vehicle. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:
1. A method comprising:
receiving at a emergency notification platform position information and acceleration information associated with a mobile device and with other mobile devices within close proximity of the mobile device, the emergency notification platform being remote from the mobile device;
comparing the position information and acceleration information of the mobile device with an average of the position information and the acceleration of the other mobile devices;
applying a rule based on the comparing to determine an alert condition;
generating a notification message based on the application of the rule; and
initiating transmission of the notification message from the emergency notification platform to one or more predetermined destinations stored at the emergency notification platform that are specified by a user of the mobile device,
wherein the notification message specifies information relating to the alert condition, and
wherein the rule specifies one or more parameters indicating an accident condition associated with a user of the mobile device.

2. A method according to claim 1, further compromising:
presenting the notification message via a display of the mobile device.

3. A method according to claim 2, wherein the rule specifies a threshold level for a degree of severity of the accident condition.

4. A method according to claim 1, further comprising:
detecting a deviation from a known course that is traversed by the mobile device, wherein the rule relates to the detected deviation.

5. A method according to claim 1, further comprising:
establishing a communication session, by the mobile device, with a predetermined communication device in response to the alert condition.

6. A method according to claim 1, wherein the mobile device includes a mobile phone or a mobile computer.

7. An apparatus comprising:
at least one processor; and
at least one memory including computer program code for one or more programs,
the at least one memory and the computer program code configured to, with the at least one processor, cause the apparatus to perform at least the following,
receive at a emergency notification platform position information and acceleration information associated with a mobile device and with other mobile devices within close proximity of the mobile device, the emergency notification platform being remote from the mobile device,
compare the position information and acceleration information of the mobile device with an average of the position information and the acceleration of the other mobile devices,
apply a rule based on the compare to determine an alert condition,
generate a notification message based on the application of the rule, wherein the notification message specifies information relating to the alert condition, and
initiate transmission of the notification message from the emergency notification platform to one or more predetermined destinations stored at the emergency notification platform that are specified by a user of the mobile device,
wherein the notification message specifies information relating to the alert condition, and
wherein the rule specifies one or more parameters indicating an accident condition associated with a user of the mobile device.

8. An apparatus according to claim 7, being further caused to:
present the notification message via a display of the mobile device.

9. An apparatus according to claim 8, wherein the rule specifies a threshold level for a degree of severity of the accident condition.

10. An apparatus according to claim 7, wherein the apparatus is further caused to:
detect a deviation from a known course that is traversed by the mobile device, wherein the rule relates to the detected deviation.

11. An apparatus according to claim 7, wherein the apparatus is further caused to:
establish a communication session, by the mobile device, with a predetermined communication device in response to the alert condition.

12. An apparatus according to claim 7, wherein the mobile device includes a mobile phone or a mobile computer.

13. A method comprising:
receiving at a emergency notification platform a notification message from a mobile device configured to generate the notification message in response to an alert condition that is determined using position information and acceleration information of the mobile device compared with an average of position information and acceleration information of other mobile devices within close proximity of the mobile device, the emergency notification platform being remote from the mobile device; and
selectively initiating transmission of the alert notification from the emergency notification platform to one or more destinations specified by a user of the mobile device,
wherein the one or more destinations specified by the user of the mobile device are stored at the emergency notification platform, and
wherein the determination of the alert condition is based on the comparison and a rule that specifies one or more parameters indicating an accident condition associated with a user of the mobile device.

14. A method according to claim 13, wherein the rule specifies a threshold level for a degree of severity of the accident condition.

15. A method according to claim 13, further comprising:
receiving a request from the mobile device to establish a communication session with a predetermined communication device in response to the alert condition.

16. An apparatus comprising:
at least one processor; and
at least one memory including computer program code for one or more programs,
the at least one memory and the computer program code configured to, with the at least one processor, cause the apparatus to perform at least the following,
receive at a emergency notification platform a notification message from a mobile device configured to generate the notification message in response to an alert condition that is determined using position information and acceleration information of the mobile device compared with an average of position information and acceleration information of other mobile devices within close proximity of the mobile device, the emergency notification platform being remote from the mobile device, and
selectively initiate transmission of the alert notification from the emergency notification platform to one or more destinations specified by a user of the mobile device,
wherein the one or more destinations specified by the user of the mobile device are stored at the emergency notification platform, and
wherein the determination of the alert condition is based on the comparison and a rule that specifies one or more parameters indicating an accident condition associated with a user of the mobile device.

17. An apparatus according to claim 16, wherein the rule specifies a threshold level for a degree of severity of the emergency condition.

18. An apparatus according to claim 16, wherein the apparatus is further caused to:
receive a request from the mobile device to establish a communication session with a predetermined communication device in response to the alert condition.

* * * * *